(12) United States Patent
Xu et al.

(10) Patent No.: US 12,274,208 B2
(45) Date of Patent: Apr. 15, 2025

(54) SELF-ADAPTIVE CONTROL SYSTEM AND METHOD FOR STUBBLE HEIGHT AND STUBBLE RIGHTING OPERATION OF RATOONING RICE

(71) Applicant: JIANGSU UNIVERSITY, Zhenjiang (CN)

(72) Inventors: Lizhang Xu, Zhenjiang (CN); Jinpeng Hu, Zhenjiang (CN); Peng Liu, Zhenjiang (CN); Shuaifeng Xing, Zhenjiang (CN); Jiahui Pan, Zhenjiang (CN); Xiaoyu Chai, Zhenjiang (CN); Zheng Ma, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/710,672

(22) PCT Filed: Sep. 22, 2022

(86) PCT No.: PCT/CN2022/120407
§ 371 (c)(1),
(2) Date: May 16, 2024

(87) PCT Pub. No.: WO2023/087904
PCT Pub. Date: May 25, 2023

(65) Prior Publication Data
US 2025/0048966 A1    Feb. 13, 2025

(30) Foreign Application Priority Data
Nov. 16, 2021  (CN) .......................... 202111353765.X (51) Int. Cl.
*A01D 65/02*     (2006.01)
*A01D 41/127*    (2006.01)
*A01D 45/04*     (2006.01)

(52) U.S. Cl.
CPC ........... *A01D 65/02* (2013.01); *A01D 41/127* (2013.01); *A01D 45/04* (2013.01)

(58) Field of Classification Search
CPC ........ A01D 45/00–45/30; A01D 65/00–65/08; A01D 34/8355
See application file for complete search history.

(56) References Cited

U.S. PATENT DOCUMENTS

| 4,807,429 A * | 2/1989 | Roberts .................. A01D 84/00 56/192 |
| 10,356,980 B2 * | 7/2019 | Rotole .................. A01D 78/14 |
| 2023/0180646 A1 * | 6/2023 | Xu ........................ A01B 49/022 460/22 |

FOREIGN PATENT DOCUMENTS

| CN | 110235601 A | 9/2019 |
| CN | 110881308 A | 3/2020 |

(Continued)

*Primary Examiner* — Christopher J Sebesta
*Assistant Examiner* — Madeline I Runco
(74) *Attorney, Agent, or Firm* — Bayramoglu Law Offices LLC (57) ABSTRACT

A self-adaptive control system for height and operation of ratooning rice stubble cutting includes a stubble righting device, a profiling contact sensor, a speed radar, and a controller; the stubble righting device is installed at the rear of the harvester, and is connected to the bracket by the stubble righting device hydraulic cylinder; the profiling contact sensor is configured to detect the height of the header above the ground and transmit data to the controller; the speed radar is configured to obtain and transmit speed information of the harvester to the controller; the hydraulic valve block is installed on the chassis frame and connected to the header lifting hydraulic cylinder and the stubble righting device hydraulic cylinder respectively; input terminals of the controller are connected to the profiling contact sensor and the speed radar, and output terminals of the (Continued)

controller are connected to the motor and hydraulic valve block.

6 Claims, 9 Drawing Sheets

(56) References Cited

FOREIGN PATENT DOCUMENTS

| | | | | |
|---|---|---|---|---|
| CN | 111296049 A | * | 6/2020 | ............. A01D 41/12 |
| CN | 107006228 B | * | 12/2020 | ............. A01D 65/02 |
| CN | 114097430 A | | 3/2022 | |
| EP | 3494771 A1 | | 6/2019 | |
| JP | 2016182084 A | | 10/2016 | |

* cited by examiner

SELF-ADAPTIVE CONTROL SYSTEM AND METHOD FOR STUBBLE HEIGHT AND STUBBLE RIGHTING OPERATION OF RATOONING RICE

CROSS REFERENCE TO THE RELATED APPLICATIONS

This application is the national phase entry of International Application No. PCT/CN2022/120407, filed on Sep. 22, 2022, which is based upon and claims priority to Chinese Patent Application No. 202111353765.X, filed on Nov. 16, 2021, the entire contents of which are incorporated herein by reference.

TECHNICAL FIELD

The present disclosure belongs to the technical field of ratooning rice combine harvesters, and specifically relates to a self-adaptive control system and method for stubble height and stubble righting operation of ratooning rice.

BACKGROUND

Ratooning rice is dual-season harvesting rice, which has the most potential rice planting pattern for increasing grain yield and is also an effective means to achieve poverty alleviation. With the continuous acceleration of agricultural mechanization, the operational technology for mechanized harvesting of ratooning rice remains relatively weak. The direct rolling rate by current harvester is generally 40-50%, and the steering area can reach as high as 80-90%, which seriously affects the yield of the second season. The rolling area yield is less than 10%. The traditional righting method of ratooning rice stubble mainly relies on manual assistance, which has a large workload and low operational efficiency, and is not suitable for large-scale planting, which restricts the large-scale promotion of ratooning rice.

Therefore, achieving the stubble righting during the first season harvesting process of ratooning rice has become a critical issue in improving the yield of ratooning rice and income of farmer. Therefore, it is necessary to design a device that can achieve stubble righting during the first season of harvesting, ensure consistent stubble height, adaptively adjust the device height and speed according to the operation requirements.

SUMMARY

In view of the above technical problems, the present disclosure designs a self-adaptive control system and method for the stubble height and righting operation of ratooning rice, which enables the current first season of ratooning rice to achieve righting operation during the mechanized harvesting process, ensuring the consistency of stubble height, and achieving joint control of stubble height and righting device height during the harvesting process of ratooning rice. At the same time, the rotation speed of the stubble righting device can be adaptively adjusted according to the forward speed; this reduces the workload of manual stubble righting operations, reduces the workload of drivers, and helps to improve the yield of ratooning rice during the second season.

The present disclosure also provides a harvester comprising a self-adaptive control system for stubble height and righting stubble operation of the ratooning rice.

The technical solution of the present disclosure is: a self-adaptive control system for the height and operation of ratooning rice stubble, including a stubble righting device, a profile contact sensor, a speed radar, and a controller;

the stubble righting device is arranged at the rear of the ratooning rice combine harvester, and is connected to the hydraulic cylinder bracket installed on the harvester through the stubble righting device hydraulic cylinder; the profiling contact sensor is configured to detect the height of the header above the ground and transmit height signal to the controller; the speed radar is configured to obtain the speed information of the harvester and transmit the speed information to the controller; the hydraulic valve block is installed on the chassis frame and is respectively connected to the header lifting hydraulic cylinder and the stubble righting device hydraulic cylinder; the input terminals of the controller are respectively connected to a profiling contact sensor and a speed radar, and the output terminals of the controller are respectively connected to a motor and a hydraulic valve block.

In the above solution, the controller includes a working condition judgment module for the stubble righting device, and a forward speed and device rotation speed matching module; the working condition judgment module of the stubble righting device judges the working condition of the machine based on the operating parameters of the harvester. When the harvester is judged to be in working condition, the profiling contact sensor measures the height of the header from the ground and sends it to the controller. The controller adjusts the stubble height by controlling the expansion or contraction of the header lifting hydraulic cylinder. After being processed by the prediction method, the controller adjusts the height of the stubble righting device by controlling the expansion or contraction of the hydraulic cylinder of the stubble righting device; the matching module for the forward speed and device rotation speed selects the corresponding speed based on the real-time measurement of the harvester forward speed by the speed radar, and sends it to the motor through the controller to adjust the rotation speed of the stubble wheel of the stubble righting device.

In the above solution, the stubble righting device comprises a righting wheel and a rotating shaft; and the stubble wheel is installed on the rotating shaft, and there are multiple connecting bars on the stubble wheel; each connecting bar is equipped with at least two tooth installation seats, which are respectively located on both sides of the connecting bar; and the tooth mounting seat is equipped with multiple teeth.

In the above solution, multiple detachable righting teeth are connected to the righting tooth installation seat.

In the above solution, the stubble righting device also includes a support arm and a reinforcing bracket; one end of the support arm is connected to the stubble wheel, and the other end is provided with a through hole, which is connected to the machine chassis through a pin shaft; the reinforcing bracket is installed between two support arms, and a connecting ring is set in the middle of the reinforcing bracket for connecting the hydraulic cylinder of the stubble righting device.

In the above solution, a header angle sensor and a stubble righting device angle sensor are also included; the header angle sensor is configured to measure the angle between the header and the frame and transmit it to the controller; the angle sensor of the stubble righting device is configured to measure the angle between the stubble righting device and the frame, and transmit it to the controller.

A harvester includes a self-adaptive control system for stubble height and stubble righting operation for ratooning rice.

A control method for a self-adaptive control system based on the height of ratooning rice stubble and stubble righting operation, including steps of determining the working condition of the stubble righting device and matching the forward speed with the device rotation speed;

determining the working condition of the stubble righting device: the working condition judgment module of the self-adaptive control system judges the working condition of the machine based on the operating parameters of the harvester; when it is determined that the harvester is in a non-working state, the controller controls the expansion or contraction of the hydraulic cylinder of the stubble righting device to lift the stubble righting device to the set safe position; when the harvester is judged to be in working condition, the profiling contact sensor measures the height of the header from the ground and sends it to the controller; the controller adjusts the height of the stubble by controlling the expansion and contraction of the header lifting hydraulic cylinder; after being processed by the prediction method, the controller adjusts the height of the stubble righting device by controlling the expansion or contraction of the hydraulic cylinder of the stubble righting device; and matching the forward speed with the device rotation speed: the self-adaptive control system's forward speed and device rotation speed matching module selects the corresponding speed based on the real-time measurement of the harvester's forward speed by the speed radar, and sends it to the motor through the controller to control the rotation speed of the stubble wheel of the stubble righting device.

In the above solution, in the step of determining the working condition of the stubble righting device, the harvester is divided into working and non-working states, and the working states include: harvesting; the non-working state includes: steering, crossing ridges, downhill, and reversing;

when the steering current is greater than the set value and lasts for the set time, it is determined as steering; when the steering current is less than or equal to the set value, it is determined that the machine is in a harvesting state; when the height of the header lifting exceeds the set threshold during ridge crossing and downhill, the machine is judged as in a state of crossing ridges or downhill; when switching to the reverse gear, it is judged as a reverse action; in addition, when the forward speed is less than the set threshold and lasts for a set time, it is determined that the machine is in an abnormal working state; in non-working and abnormal working conditions, the motor stops rotating and the stubble righting device is lifted to a safe position.

In the above solution, the prediction method in the step of determining the working condition of the stubble righting device includes:

the relationship between the height change of the header and the expansion and contraction of the header hydraulic cylinder is:

$$\Delta H_i = L_1 \left[ \cos\left( \sum_{i=1}^{n-1}(\Delta\theta_i + \theta_0) + \arccos\frac{m^2 + k^2 - (\Delta K + L_2)^2}{2mk} - \left( \sum_{i=1}^{n-1}(\Delta\theta_i + \theta_0) - \alpha \right) \right) - \cos\left( \sum_{i=1}^{n-1}(\Delta\theta_i + \theta_0) \right) \right],$$

where $\Delta H_i$ is the change in stubble height, $L_1$ is the distance from the rotation center C to the cutting blade E, i is the time, $\theta_i$ is the angle measured by the header angle sensor at time i, $\Delta\theta_i$ is the angle change measured by the header angle sensor, $\theta_0$ is the initial included angle of the header, m is the distance from the rotation center C to the support point of the hydraulic cylinder, k is the distance from the rotation center C to the installation position A of the hydraulic cylinder, $\Delta K$ is the distance from the header lifting hydraulic cylinder; $L_2$ is the length of the header lifting hydraulic cylinder, $\alpha$ is the angle of $\angle ACD$, where point A is the fulcrum of the header hydraulic cylinder, and point C is the center of rotation of the conveyor through, D is the point where point C is perpendicular to the ground, and $\alpha$ is a fixed angle;

the relationship between the expansion or contraction of the hydraulic cylinder and the height change of the device is as follows:

$$\Delta K' = \sqrt{\left(L\cos\left(\theta_0' + \frac{1}{l}\sum_{i=1}^{n}\Delta H_i\right) - a\right)^2 + \left(L\sin\left(\theta_0' + \frac{1}{l}\sum_{i=1}^{n}\Delta H_i\right) - b\right)^2} - \sqrt{\left(L\cos\left(\arcsin\frac{\Delta H_i}{l} + \theta_0' + \frac{1}{l}\sum_{i=1}^{n}\Delta H_i\right) - a\right)^2 + \left(L\sin\left(\arcsin\frac{\Delta H_i}{l} + \theta_0' + \frac{1}{l}\sum_{i=1}^{n}\Delta H_i\right) - b\right)^2};$$

where $\theta_i$ is the angle between the support arm and the chassis frame measured at time i, with an initial angle of $\theta_0'$. (a, b) is the coordinate of the installation support point of the hydraulic cylinder of the stubble righting device, $\Delta K'$ is the extension of the hydraulic cylinder of the stubble righting device, l is the distance between the arm rotation center B and the stubble righting device shaft center F, and L is the distance between the arm rotation center B and the connection point G between they hydraulic cylinder and the bracket.

In the above solution, the steps for matching the forward speed with the device rotation speed are as follows:

collecting the speed signal of the combine harvester and inputting the speed signal into the controller by the speed radar; obtaining, by the self-adaptive control system forward speed and device rotation speed matching module, the optimal matching relationship between the forward speed and the stubble righting device speed based on simulation: selecting the corresponding speed based on the real-time speed signal of the harvester collected by the speed radar and sending the corresponding speed to the motor through the controller by the forward speed and device rotation speed matching module, thus controlling the rotation speed of the rotation shaft of the stubble righting device.

Compared with the existing technology, the beneficial effect of the present disclosure is that the present disclosure can realize the righting operation of the stubble rolled by the crawler or wheeled harvester during the first-season harvesting, effectively realizing the integration of ratooning rice harvesting and stubble righting, and thus reduce the loss of the second-season yield. The present disclosure ca self-adaptively adjust the height of header, the height and rotation speed of the stubble righting device, and automatically maintain the height of the stubble and the height of the stubble righting device from the ground, ensuring the best effect of the stubble righting operation, in accordance with the requirements of the operation: Under non-working conditions, lift the stubble righting device to a safe position through a hydraulic cylinder to avoid installation touching the ground during conditions such as crossing ridge, downhill, and steering affects the normal operation of the machine. Compared to manual control, the self-adaptive control system has high adjustment accuracy and fast response, greatly reducing the labor intensity of the driver.

In the figures, 1. Hydraulic cylinder support, 2. Hydraulic cylinder of stubble righting device, 3. Reinforce support, 4. Motor, 5. Stubble righting device, 5-1. Tooth installation seat, 5-2. Connecting bar, 5-3. Righting tooth, 5-4. Eccentric adjustment plate, 5-5. Outer disc, 5-6. Inner disc, 5-7. Support arm, 5-8. Rotating shaft, 6. Motor mounting bracket, 7. Profiling contact sensor, 8. Clutch handle, 8-1. Input switch, 8-2. High, medium, and low speed gear switch 9. Controller, 10. Hydraulic valve block, 11. Speed radar, 12. Header lifting hydraulic cylinder, 13. Display screen.

DETAILED DESCRIPTION OF THE EMBODIMENTS

Embodiments of the present disclosure are described in detail below, examples of which are shown in the accompanying figures, wherein the same or similar labels represent identical or similar components or components with identical or similar functions. The embodiments described below with reference to the accompanying figures are exemplary and intended to explain the present disclosure, but cannot be understood as limiting the present disclosure.

In the description of the present disclosure, it should be understood that the terms "center", "longitudinal", "transverse", "length", "width", "thickness", "up", "down", "axial", "radial", "vertical", "horizontal", "inside", "outside", etc. refer to the orientation or position relationship based on the attached drawings, only for the convenience of describing the present disclosure and simplifying the description, rather than indicating or implying that the device or component referred to must have a specific orientation, be constructed and operated in a specific orientation, therefore it cannot be understood as a limitation of the present disclosure. In addition, the terms "first" and "second" are only used to describe the purpose and cannot be understood as indicating or implying relative importance or implying the quantity of technical features indicated. Therefore, features limited to "first" and "second" can explicitly or implicitly include one or more of these features. In the description of the present disclosure, "multiple" means two or more, unless otherwise specifically defined.

In the present disclosure, unless otherwise specified and limited, the terminology such as "installation", "connection", "connection", "fixed" should be understood in a broad sense, for example, it can be a fixed connection, a detachable connection, or an integrated connection; It can be a mechanical connection or an electrical connection; It can be directly connected, or indirectly connected through an intermediate medium, or it can be the internal connection between two components. For ordinary technical personnel in this field, the specific meanings of the above terms in the present disclosure can be understood based on specific circumstances.

Figure 1:
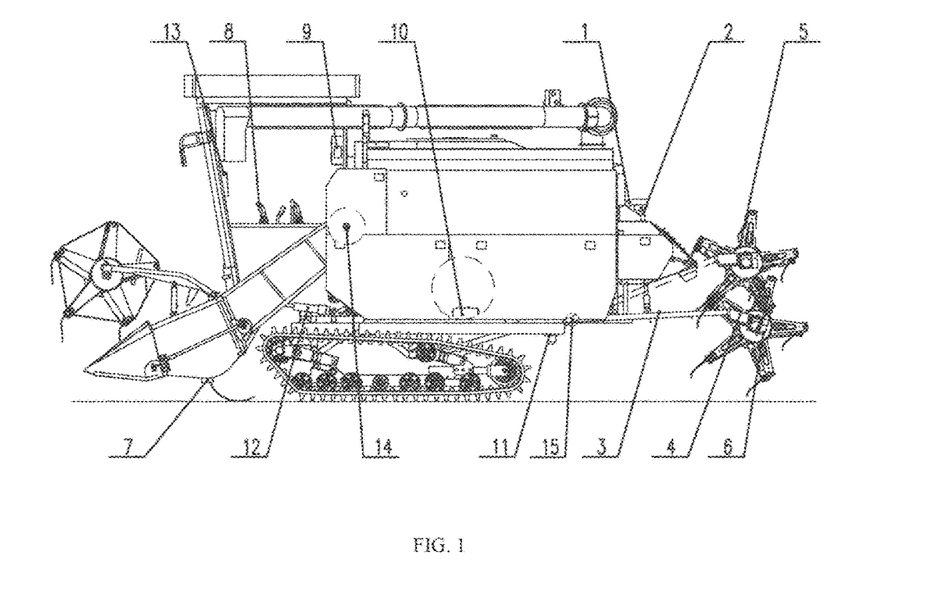
FIG. 1: An overall machine layout diagram of an embodiment of the present disclosure.

FIG. 1 shows a preferred implementation of the self-adaptive control system for the stubble height and righting operation of the ratooning rice. The system includes a stubble righting device 5, a profiling sensor 7, speed radar 1I, clutch handle 8, header angle sensor 14, righting device angle sensor 15, and controller 9.

The stubble righting device 5 is installed at the rear of the ratooning rice combine harvester, and the stubble righting device 5 is connected to the hydraulic cylinder support I by hydraulic cylinder 2; the profiling sensor 7 is configured to detect the height of the header above the ground and transmit it to the controller 9; the speed radar 11 is configured to obtain the speed information of the harvester and transmit it to the controller 9; the hydraulic valve block 10 is installed on the chassis frame and is respectively connected to the header lifting hydraulic cylinder 12 and the stubble righting device hydraulic cylinder 2; the header angle sensor 14 is configured to measure the angle between the header and the frame and transmit it to the controller 9; the angle sensor 15 of the stubble righting device is configured to measure the angle between the stubble righting device 5 and the frame, and transmit it to the controller 9. The input terminals of the controller 9 are respectively connected to the profiling contact sensor 7, the speed radar 11, the header angle sensor 14, and the stubble righting device angle sensor 15. The output terminals of the controller 9 are respectively connected to the motor 4 and the hydraulic valve block 10.

The controller 9 includes a working condition judgment module for the stubble righting device and a forward speed matching module for the device rotation speed; the working condition judgment module of the stubble righting device judges the working condition of the machine based on the operating parameters of the harvester. When the harvester is judged to be in working condition, the profiling sensor 7 measures the height of the header from the ground and sends it to the controller 9. The controller 9 regulates the stubble height by controlling the extension or retraction of the header lifting hydraulic cylinder 12. The controller 9 processes the data through a predictive method and controls the height of the stubble righting device 5 by controlling the hydraulic cylinder 2; the forward speed and device rotation speed matching module selects the corresponding rotation speed based on the harvester forward speed measured by the speed radar 11 in real time, and sends it to the motor 4 through the controller 9 to control the rotation speed of the stubble rotating shaft of the stubble support device 5.

Figure 2:
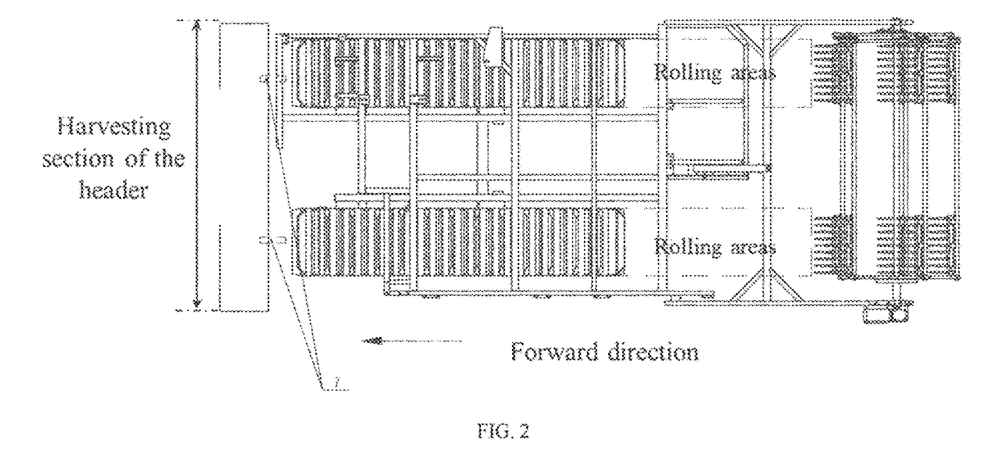
FIG. 2: A schematic diagram of the working section of the stubble righting device according to an embodiment of the present disclosure.

Preferably, the stubble righting device 5 is connected to the rear of the ratooning rice combine harvester through a pin shaft, and is connected to the hydraulic cylinder bracket 1 welded between the oil tank and the grass crusher through the stubble righting device hydraulic cylinder 2; the clutch handle 8, the controller 9, and the display screen 13 are located on the control panel in the cab; the stubble height information and the stubble righting device height information are displayed on the display screen 13 for the convenience of the operator to adjust. The profiling sensor 7 is installed below the header, as shown in FIG. 2; the speed radar 11 is installed behind the machine chassis, on the right side of the oil tank without any obstruction. The hydraulic valve block 10 is installed on the chassis. The frame is connected to the header lifting hydraulic cylinder 12 and the stubble righting device hydraulic cylinder 2, respectively; the input end of the controller 9 is connected to the profiling sensor 7 and the speed radar 11, and the output end of the controller is connected to the motor 4 and the hydraulic valve block 10, respectively. The speed radar 11 is installed behind the machine chassis, and there is no obstruction on the right side of the fuel tank. The hydraulic valve block 10 is mounted on the upper chassis frame, connected to the header lifting hydraulic cylinder 12 and the stubble righting device hydraulic cylinder 2. The input end of the controller 9 is connected to the profile contact sensor 7 and the speed radar 11, and the output end of the controller is connected to the motor 4 and the hydraulic valve block 10.

The controller 9 includes a working condition judgment module, a forward speed and device rotation speed matching module. The stubble device condition judgment module determines the operating condition of the machine based on the operating parameters of the harvester. When it is judged that the harvester is in working condition, the profile contact sensor 7 measures the height of the header above the ground and sends it to the controller 9. The controller 9 adjusts the stubble height by controlling the extension or retraction of the header lifting hydraulic cylinder 12. The controller 9 adjusts the height of the stubble device 5 by controlling the extension and retraction of the stubble device hydraulic cylinder 2 after processing through a prediction method. The forward speed and device rotation speed matching module selects the corresponding rotation speed based on the real-time measurement of the harvester's forward speed by the speed radar 11, and sends it to the motor 4 through the controller 9, thus controlling the rotation speed of the stubble device 5.

Preferably, the stubble righting device 5 is connected to the rear of the ratoon rice combine harvester through pin shafts, and is connected to the hydraulic cylinder bracket 1 welded between the fuel tank and the grass chopper through the stubble righting device hydraulic cylinder 2; the clutch handle 8, controller 9, and display screen 13 are arranged on the control panel in the cab; the stubble height information and the stubble righting device height (clearance to earth) information are displayed on the screen 13 for operator to adjust. The profile contact sensor 7 is installed below the header, and the track will roll the inside of the area, as shown in FIG. 2; the speed radar 11 is installed on the rear of the machine chassis, on the right side of the fuel tank without any obstruction. The hydraulic valve block 10 is installed on the chassis frame, and is connected to the header lifting hydraulic cylinder 12 and the stubble righting device hydraulic cylinder 2 respectively; the input end of the controller 9 is connected to the profile contact sensor 7 and the speed radar 11, and the output end of the controller is connected to the motor 4 and the hydraulic valve block 10 respectively.

Figure 3:
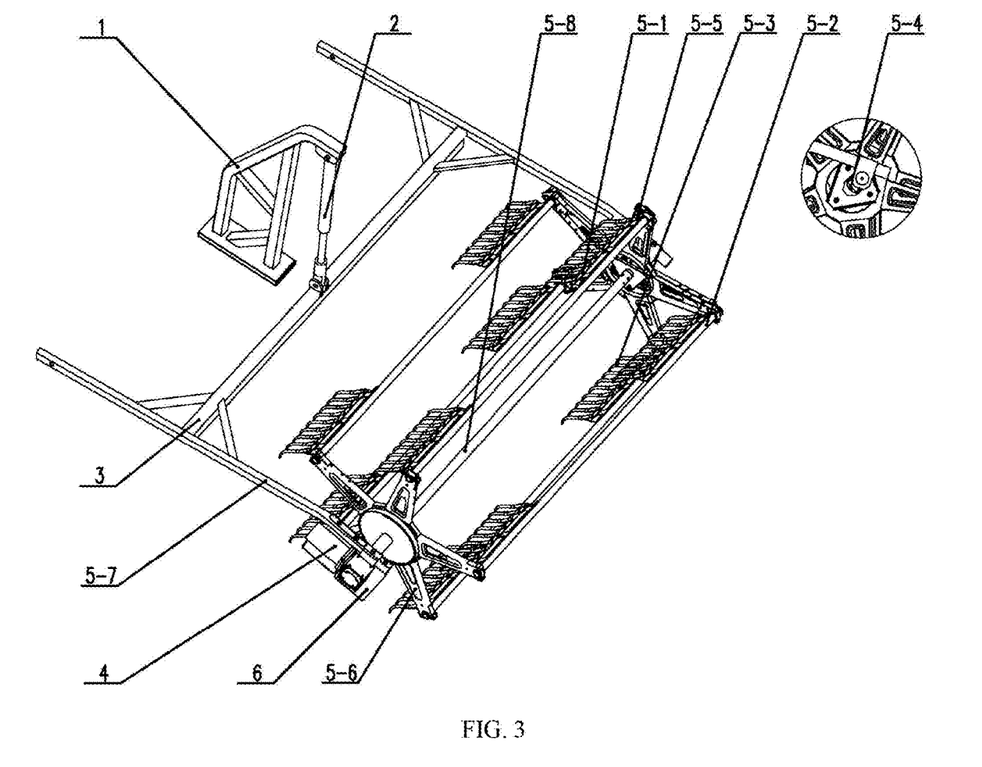
FIG. 3: A schematic diagram of the stubble righting device structure according to an embodiment of the present disclosure.

The stubble righting device 5 shown in FIG. 3 includes a stubble support wheel, support arms 5-7, a rotating shaft 5-8, and a motor 4; the stubble righting device is mounted on the rotating shaft 5-8, and the inner disk 5-6 of the device is mounted on each end of the rotating shaft 5-8, and the outer disk 5-5 is mounted on one end of the rotating shaft 5-8 and located outside the inner disk 5-6. The outer disk 5-5 contains an eccentric adjustment plate 5-4, which is connected to the rotating shaft 5-8; the stubble righting device contains several connecting bar 5-2, each of them has at least two stubble support seats 5-1, located on both sides of the connecting bar 5-2, and are configured to right the stubble rolled by the track, also reduce the weight of the fuselage, and righting teeth 5-3 are mounted on the stubble support seat 5-1.

Preferably, the righting teeth 5-3 are detachably and connected to the tooth installation seat 5-1; stubble righting device 5 is driven by a motor 4 that mounted on the motor mounting bracket 6, the motor 4 is connected to one of the rotating shaft 5-8 end by key connection; the end of support arm 5-7 has a through hole, which is configured to connect with machine chassis by pin shafts; the reinforcement support 3 is welded between the two support arms 5-7, with a connecting ring welded in the middle for connecting the stubble righting device hydraulic cylinder 2; Righting teeth 5-3 are flexible, which can be disassembled and changed according to the actual working conditions, and the assemble density can be adjusted manually. The two working sections of the stubble righting device are equal to the width of the caterpillar.

Preferably, the righting tooth 5-3 is made of flexible material, which is connected to the tooth installation seat 5-1 by bolts and can be disassembled and replaced according to the working conditions and stubble righting effects; the teeth 5-3 can be disassembled/added to change the assemble density; the angle of the teeth 5-3 can be adjusted through the eccentric adjusting plate 5-4 on the stubble righting device 5, which can be adjusted 45° clockwise and counterclockwise; the connecting bar 5-2 is a hollow bar that provides sufficient strength while reducing overall weight; the lowest height $h_i$ of the stubble righting device 5 from the ground is set to be 30-50 mm.

The stubble height is controlled by the header lifting hydraulic cylinder 12 to maintain the header lifting; the height of the stubble righting device 5 is regulated by the hydraulic cylinder 2 connected to the hydraulic valve group 10; the motor 4 is connected to one end of the rotating shaft 5-8 by key connection to drive the stubble righting device 5.

Figure 4:
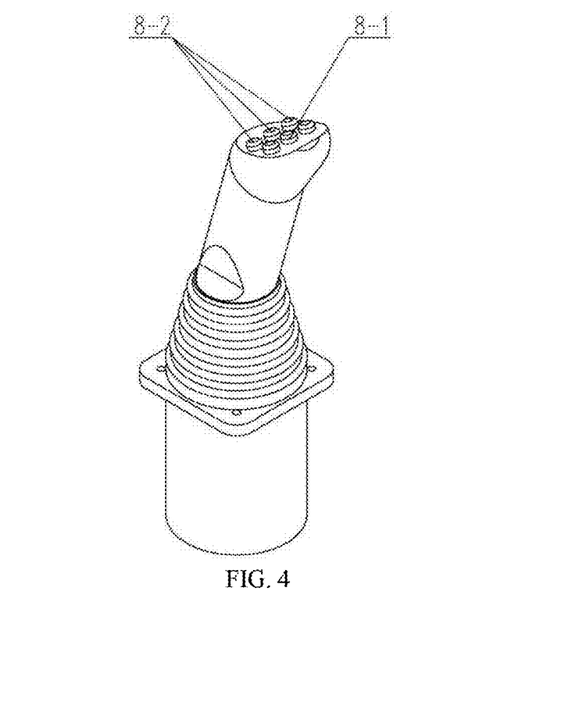
FIG. 4: A schematic diagram of the control clutch handle of an embodiment of the present disclosure.

As shown in FIG. 4, the clutch handle 8 is equipped with an input switch 8-1: when the switch is turned off, it enters the manual control mode; When the input switch is turned on, it enters the automatic regulation mode.

In manual mode, the header height can be adjusted by moving the control handle forward and backward, the lifting and lowering of the stubble righting device can be controlled by moving the handle left and right, and the speed of the stubble righting device can be adjusted by pressing the buttons on the handle. The manual gear has high, medium, and low speed switch 8-2, including low, medium, and high three switch positions.

In the automatic regulation mode, the controller starts the working condition judgment system of the stubble righting device, the matching system of the forward speed with the device rotation speed. When the system judges that the machine is in a non-working state, the controller 9 sends a signal, the motor 4 stops working, and the stubble righting device is lifted to a safe position under the lifting of the hydraulic cylinder 2. When it is judged to be in a working state, the height above the ground is measured by the profile contact sensor 7 installed below the header and input to the controller 9. The controller 9 eliminates abnormal data, reduces noise, and adjusts the stubble height by extending and retracting the header lifting hydraulic cylinder 12. The stubble righting device 5 is lowered to the working position, and the motor 4 works. At this time, the rotation speed of the stubble righting device is the default initial rotation speed. At the same time, the controller 9 processes the prediction method and controls the stubble righting device 5 behind the machine by extending or retracting the hydraulic cylinder 2 of the device to adjust the height until the input switch is turned off and the stubble righting device 5 is lifted to a safe position.

The speed radar 11 collects the speed signal of the combine harvester and inputs it into the controller 9. Based on the optimal matching relationship between the forward speed and the rotation speed of the stubble righting device obtained in the Recurdyn simulation, the rotation speed of the stubble righting device 5 is adjusted by controlling the rotation speed of the motor 4.

Figure 8:
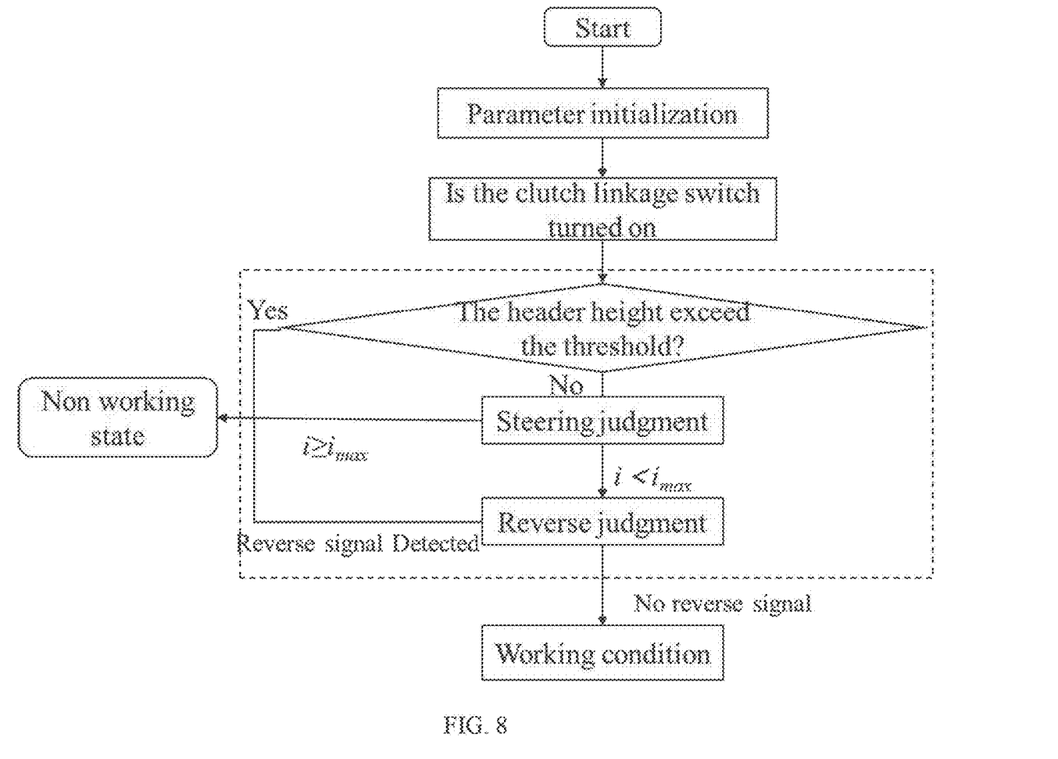
FIG. 8: A working condition determination flowchart of an embodiment of the present disclosure.
Figure 9:
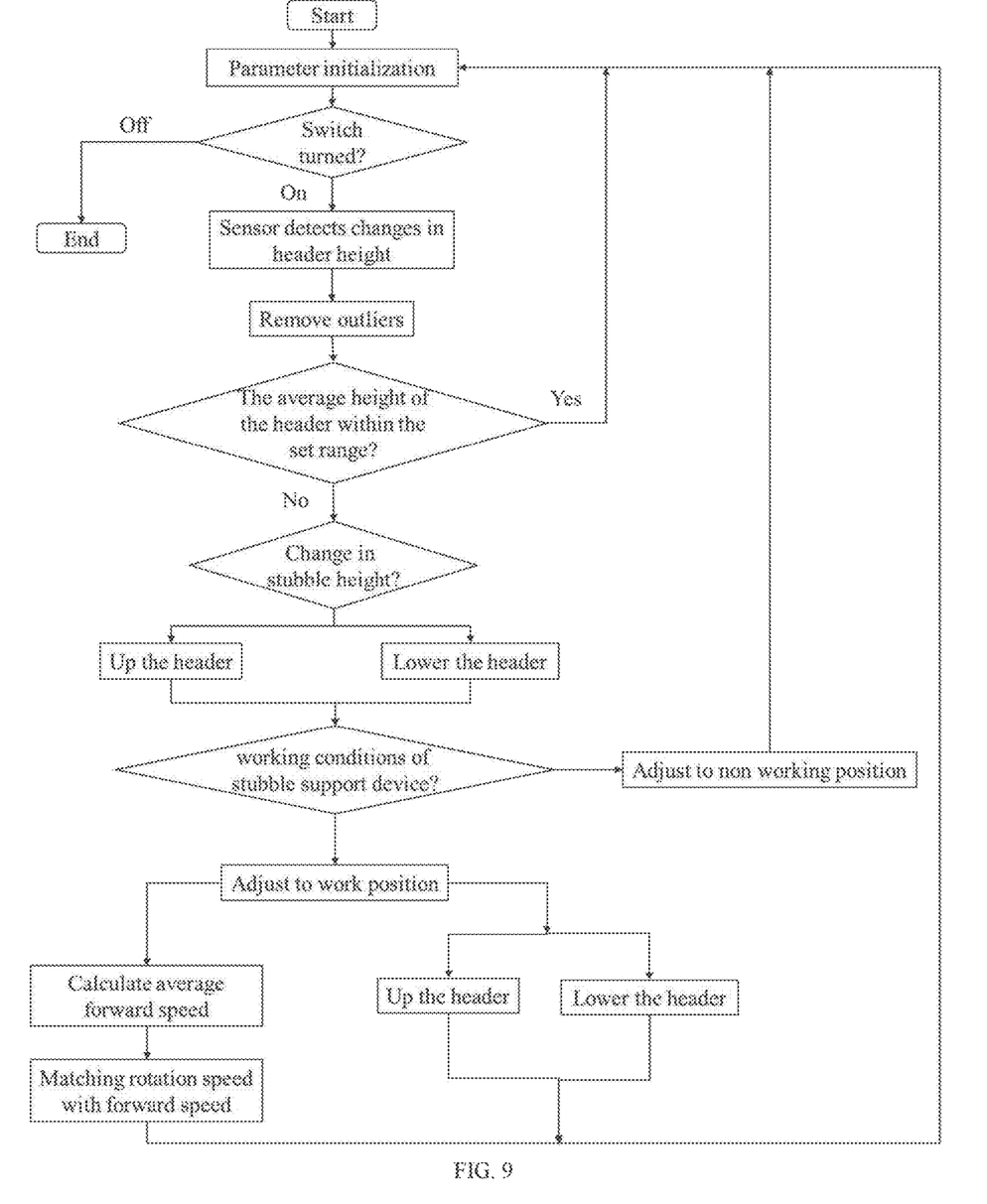
FIG. 9: A control flowchart of a height adjustment system according to an embodiment of the present disclosure.

As shown in the flow chart of condition judgment in FIG. 8, the condition analysis system judges the machine's operating conditions based on the harvester operating parameters, which are divided into working and non-working states. The working states include harvesting, while the non-working states include turning, crossing a ridge, going downhill, and reversing.

A control method for self-adaptive regulation system based on the stubble height and stubble righting operation of ratooning rice, including steps of righting device condition determination, and matching of forward speed and device rotation speed;

determining the working condition of the stubble righting device: the working condition judgment module of the self-adaptive regulation system of the stubble righting device judges the working condition of the machine according to the operation parameters of the harvester. When it is determined that the harvester is in a non-working state, the controller 9 controls the telescopic hydraulic cylinder 2 of the stubble righting device to lift the stubble righting device 5 to a set safe position. When it is determined that the harvester is in a working state, the profile contact sensor 7 measures the height of the header above the ground and sends it to the controller 9. The controller 9 adjusts the stubble height by controlling the header hydraulic cylinder 12. After processing by the prediction method, the controller 9 controls the hydraulic cylinder 2 to adjust the height of the stubble righting device 5; and matching the forward speed and the rotation speed of the device: the forward speed matching module of the self-adaptive regulation system selects the corresponding rotation speed based on the forward speed of the harvester measured by the speed radar 11 in real time, and sends it to the motor 4 through the controller 9 to adjust the rotation speed of the stubble righting device 5.

According to this embodiment, preferably, in the step of determining the working condition of the stubble righting device, the harvester is divided into working and non-working states, and the working states include: harvesting; the non-working state includes: steering, crossing ridges, downhill, and reversing;

when the steering current is greater than the set value and continues for a set period of time, it is determined to be steering. When the steering current is less than or equal to the set value, it is determined that the machine is in the harvesting state. When crossing ridges, downhill, the height of the header raised exceeds the set threshold, it is determined that the machine is in the state of overpassing ridges or downhill. When switching to the reverse gear, it is determined to be a reversing action. In addition, when the forward speed is less than the set threshold and continues for a set period of time, it is determined that the machine is in an abnormal working state. In the non-working state and abnormal working state, the motor 4 stops and the stubble righting device 5 is raised to a safe position.

Figure 5A:
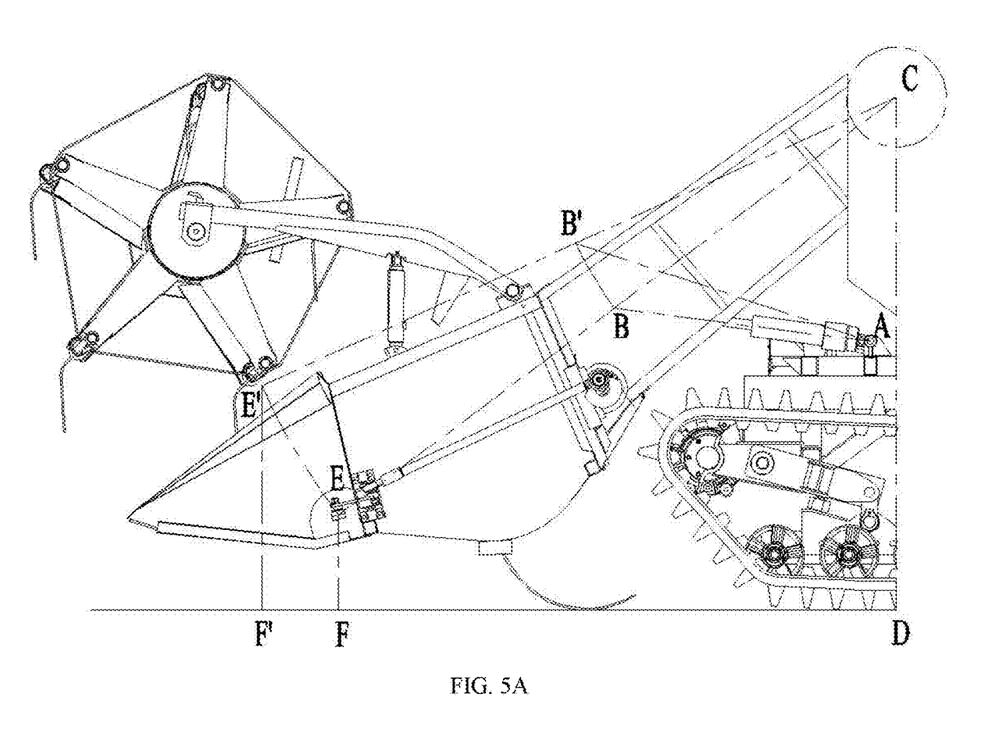
FIG. 5A: Schematic diagram of stubble height control.
Figure 5B:
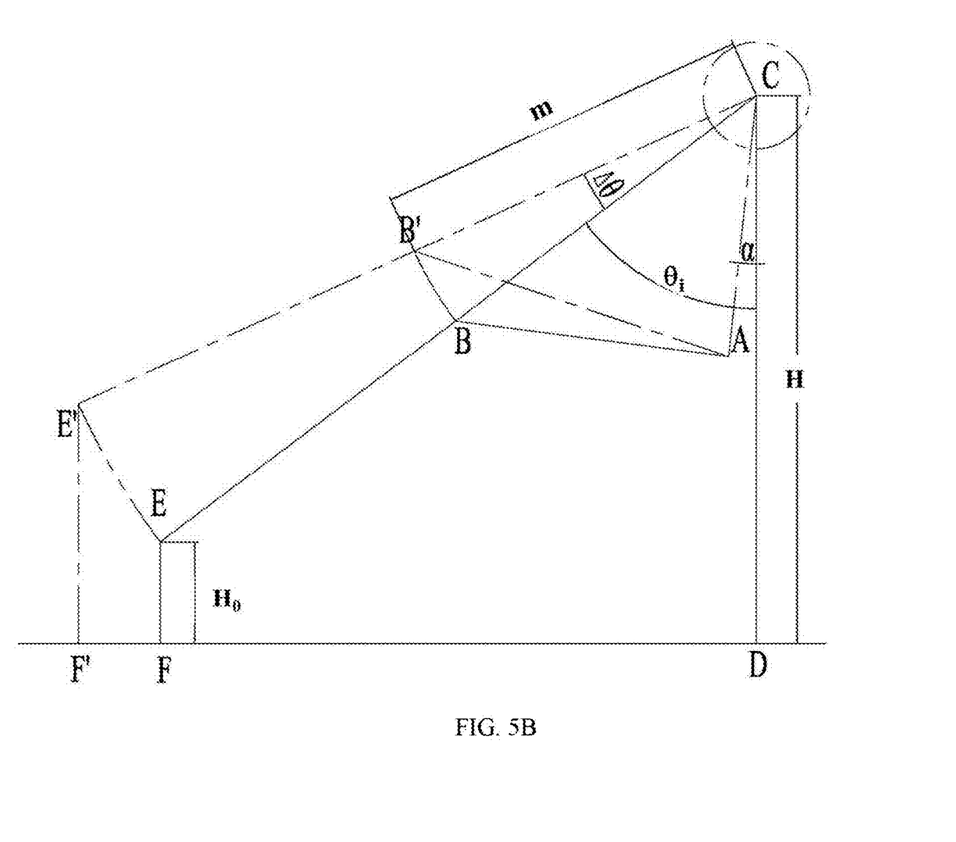
FIG. 5B: Simplified schematic diagram of stubble height control.

In the step of determining the working condition of the stubble righting device, the prediction method includes:

As shown in FIGS. 5A-5B, 6A-6B, 7, 8 and 9, before starting work, it is necessary to calibrate the relationship between the hydraulic cylinder extension and the ground clearance of the stubble righting device. Hi is the ground clearance of header at time i, the height measured in the next second is $H_{i+1}$. When it comes to working condition, the stubble righting device is put to working height $h_1$, and header is lower to $H_0$, variation of stubble height $\Delta H_i = H_{i+1} - H_i$, hydraulic cylinder expansion/contraction amount is $\Delta K$. The angle sensor measured angle at time i is $\theta_i = \Sigma(\Delta\theta_i + \theta_0\, n-1)$. $i=0$, $\Delta\theta_0 = 0$. The angle change measured by the angle sensor $\angle ECE' = \Delta\theta_i$, $\iota_0$ is the initial angle of header. As shown in the picture, $\angle ACD = \alpha$, $\angle ACE = \theta_i - \alpha$, distance between rotation center C and the cutting bar is CE, $CE = CE' = L_1$, cylinder length $AB = L_2$. The distance from the rotation center C to the support point B of the hydraulic cylinder is $CB = CB' = m$, distance between rotation center C and cylinder fix position B is CA, $CA = k$. Rotation center ground clearance $CD = H$. Ground clearance of cutting bar on header $EF = H_0 = H - L_1\cos\theta_i$, $E'F' = H - L_1\cos(\theta_i + \Delta\theta)$, $\Delta H = E'F' - EF$. The relationship between the header height variation and the header hydraulic cylinder length is:

$$\Delta H_i = L_1\left[\cos\left(\sum_{i=1}^{n-1}(\Delta\theta_i + \theta_0) + \arccos\frac{m^2 + k^2 - (\Delta K + L_2)^2}{2mk} - \left(\sum_{i=1}^{n-1}(\Delta\theta_i + \theta_0) - \alpha\right)\right) - \cos\left(\sum_{i=1}^{n-1}(\Delta\theta_i + \theta_0)\right)\right],$$

where $\Delta H_i$ is the variation in stubble height, $L_1$ is the distance from the rotation center C to the cutting bar E, i represents the time, $\theta_i$ is the angle measured by the header angle sensor 14 at time i, $\Delta\theta_i$ is the angle variation measured by the header angle sensor 14, $\theta_0$ is the initial angle of the header, m is the distance from the rotation center to the support point of the hydraulic cylinder, k is the distance from the center of rotation C to the installation position A of the hydraulic cylinder, $\Delta K$ is the extension of the header lifting hydraulic cylinder, $L_2$ is the length of the header lifting hydraulic cylinder, $\alpha$ is the angle of $\angle ACD$, where point A is the pivot point of the header hydraulic cylinder, point C is the rotation center of the conveyor, point D is the point perpendicular to the ground at point C, and α is the fixed angle;

the average forward speed V measured by the speed radar 11 is calculated by the controller 9. The distance between the contact point of the mechanical profiling contact sensor 7 and the shaft rotation center of the stubble righting device 5 is a fixed value $S_1$, and the measurement period is $T=S_1/v$.

Figure 6A:
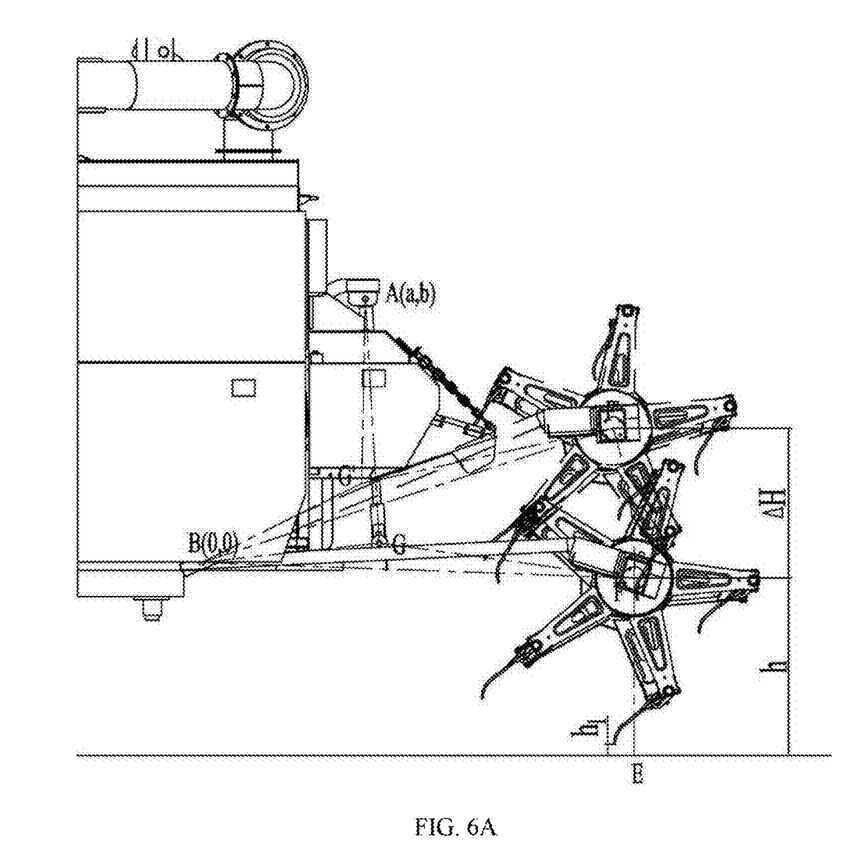
FIG. 6A: Schematic diagram of height control of stubble righting device.
Figure 6B:
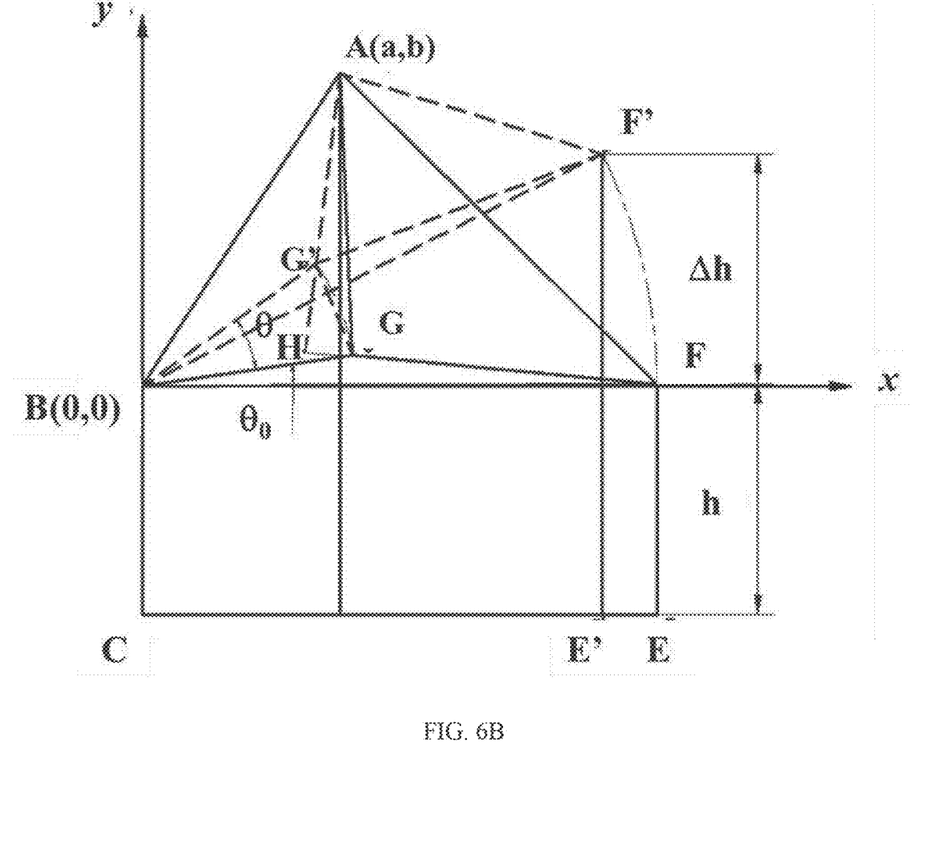
FIG. 6B: Simplified schematic diagram of height control of stubble righting device.
Figure 7:
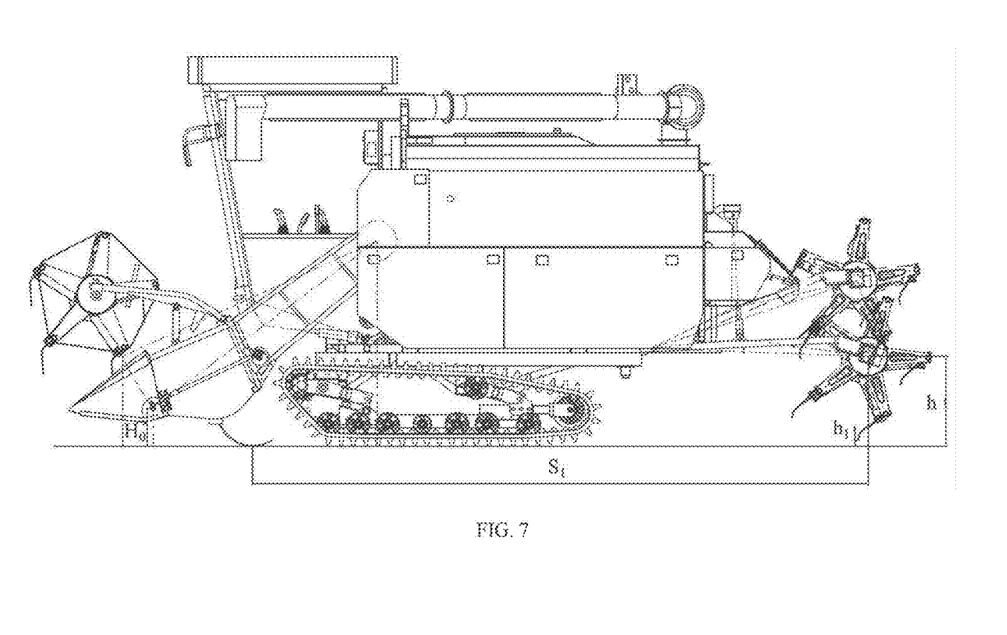
FIG. 7: A schematic diagram of the overall operation of an embodiment of the present disclosure.

The angle sensor 15 measures the angle $\theta_r$ or between the arm BG and the chassis frame, and the device angle variation is $\Delta\theta_r$. Set the installation point coordinates of righting device hydraulic cylinder 2 to be A(a,b), and the hinge point B(0,0) of support arm 5-7 and the frame. F is the rotation center of the stubble righting device 5, and G is the installation point of the hydraulic cylinder 2 and the reinforce support 3. BF=BF'=l, BG=BG'=L, (Lcos$\theta_r$, Lsin$\theta_r$), G'(Lcos$(\Delta\theta_r+\theta_r)$, Lsin$(\Delta\theta_r+\theta_r)$). The expansion or contraction amount of the hydraulic cylinder of the stubble righting device $$\Delta K' = |AG - AG'|, \ \sin\Delta\theta_i' = \frac{\Delta H_i}{i},$$

$$\Delta\theta_i' = \arcsin\frac{\Delta H_i}{i}, \ \theta_i' = \theta_0' + \frac{1}{l}\sum_{i=1}^{n}\Delta H_i.$$

The relationship between the hydraulic cylinder expansion/contraction and the height change of the stubble righting device is:

$$\Delta K' = \sqrt{\left(L\cos\left(\theta_0' + \frac{1}{l}\sum_{i=1}^{n}\Delta H_i\right) - a\right)^2 + \left(L\sin\left(\theta_0' + \frac{1}{l}\sum_{i=1}^{n}\Delta H_i\right) - b\right)^2} - \sqrt{\left(L\cos\left(\arcsin\frac{\Delta H_i}{l} + \theta_0' + \frac{1}{l}\sum_{i=1}^{n}\Delta H_i\right) - a\right)^2 + \left(L\sin\left(\arcsin\frac{\Delta H_i}{l} + \theta_0' + \frac{1}{l}\sum_{i=1}^{n}\Delta H_i\right) - b\right)^2},$$

where $\theta_r$ is the angle between the support arm and the chassis frame measured at time i, and the initial angle is $\theta_0'$, (a, b) is the coordinate of the mounting point of the stubble righting cylinder, n is the time value, $\Delta K'$ is the expansion or contraction amount of the device cylinder, l is the distance between the arm rotation center B and the rotation shaft center F, and L is the distance between the arm rotation center B and the connection point G between the hydraulic cylinder and the reinforce support.

The height and speed of the stubble righting device are adjusted once per measurement cycle T. The average value of the effective data ΔH within the measurement cycle is selected to determine whether the stubble height variation exceeds the set stubble height range. When it exceeds the range, the average value of the variation ΔH within one cycle is the required adjustment for the stubble righting device. Based on the relationship between the hydraulic cylinder contraction/extension length and the stubble righting device ground clearance, the controller calculates the required contraction/extension length of the hydraulic cylinder, and controls the stubble righting device hydraulic cylinder to adjust the device ground clearance, to make sure the device height is within the working range.

The step of matching the forward speed with the rotating speed of the device is specifically as follows:

The speed radar 11 collects the speed signal of the combine harvester and inputs it into the controller 9. The matching module of the self-adaptive regulation system obtains the optimal matching relationship between the forward speed and the rotation speed of the stubble righting device according to simulation. The matching module selects the corresponding rotation speed according to the speed signal of the harvester collected in real time by the speed radar 11, and sends it to the motor 4 through the controller 9, thus controlling the rotation speed of the stubble righting device 5.

Preferably, the forward speed and rotation speed of the stubble righting device 5 are set using dynamic simulation software such as Recurdyn. By adding trajectory points on the tooth tips of the stubble righting device 5-3, the trajectory under the corresponding forward speed and device rotation speed is observed. To avoid missing stubbles and the number of strikes should be minimized, the forward speed and stubble righting device rotation speed are matched according to the trajectory. The optimal rotation speed in multiple forward speed ranges is obtained using simulation software. According to the simulation results, when the speed is below the set minimum threshold. the motor stops. For example, when the speed is between the minimum threshold and 0.6 m/s, the motor speed is 60 r/min; When the speed is between 0.6 m/s and 0.8 m/s, the motor speed is 70 r/min; When the speed is between 0.8 m/s and 1.0 m/s, the motor speed is 75 r/min; When the speed is between 1.0 m/s and 1.2 m/s, the motor speed is 80 r/min; When the speed is between 1.2 m/s and 1.5 m/s, the motor speed is 90 r/min.

The controller 9 selects the corresponding device speed data based on the actual machine forward speed measured by the speed radar 11, and sends it to the motor 4 through controller 9.

By adding a flag bit to the steering current in the control program, when the steering current is greater than the set value and continues for a certain period of time, it is determined to be steering. When it is less than or equal to the set value, it is determined that the machine is in the harvesting state. When crossing the ridge and going downhill, the header needs to be lifted to a safe height. A threshold value slightly lower than this safety value is set. When the header height exceeds this threshold value, it is determined that the machine is in the state of over-ridge and downhill. When switching to the reverse gear, it is determined to be a reversing action. In addition, when the forward speed is less than the set threshold value and continues for a certain period of time, it is determined that the machine is in an abnormal working state. In the non-working state and abnormal working state, the motor stops and the stubble device is lifted to a safe position.

The series of detailed descriptions listed above are only specific descriptions of feasible embodiments of the present disclosure, and they are not intended to limit the scope of protection of the present disclosure. Equivalent embodiments or modifications that do not depart from the technical spirit of the present disclosure should be included within the scope of protection of the present disclosure.

What is claimed is:

1. A self-adaptive control system for stubble height and righting operation of ratooning rice, comprising a stubble righting device, a profiling contact sensor, a speed radar, and a controller;

wherein the stubble righting device is arranged at a rear of a combine harvester, and the stubble righting device is connected to a hydraulic cylinder bracket installed on the combine harvester through a stubble righting device hydraulic cylinder; the profiling contact sensor is configured to detect a height of a header above ground and transmit data to the controller; the speed radar is configured to obtain speed information of the combine harvester and transmit the speed information to the controller; a hydraulic valve block is installed on a chassis frame and is respectively connected to a header lifting hydraulic cylinder and the stubble righting device hydraulic cylinder; an input terminal of the controller is connected to the profiling contact sensor and the speed radar, and an output terminal of the controller is connected to a motor and the hydraulic valve block;

a header angle sensor and a stubble righting device angle sensor are further comprised, wherein the header angle sensor is configured to measure a first angle between the header and the chassis frame and transmit the first angle to the controller, and the stubble righting device angle sensor is configured to measure a second angle between the stubble righting device and the chassis frame, and transmit the second angle to the controller;

the controller comprises a working condition judgment module for the stubble righting device, and a forward speed and device rotation speed matching module;

the combine harvester is divided into a working state and a non-working state, wherein the working state comprises: harvesting, and the non-working state comprises: steering, crossing ridges, downhill, and reversing;

when a steering current is greater than a set value and lasts for a set time, it is determined as the steering state; when the steering current is less than or equal to the set value, it is determined that the combine harvester is in the harvesting state; when the height of the header lifting exceeds a set threshold during ridge crossing and downhill, it is determined that the combine harvester is in the non-working state; when switching to a reverse gear, it is judged as a reverse action; in addition, when a forward speed is less than the set threshold and lasts for the set time, it is determined that the combine harvester is in an abnormal working state; under the non-working state and the abnormal working state, the motor stops rotating and lifts the stubble righting device to a safe position;

the stubble righting device comprises a righting wheel and a rotating shaft;

the righting wheel is installed on the rotating shaft, and a plurality of connecting bars are arranged on the stubble righting device; each of the plurality of connecting bars is equipped with at least two tooth installation seats, wherein the at least two tooth installation seats are respectively located on both sides of each of the connecting bar; the tooth installation seats are each equipped with a plurality of teeth;

steps of determining a working condition of the stubble righting device, and matching the forward speed with a device rotation speed are as follows:

determining the working condition of the stubble righting device: the working condition judgment module of the self-adaptive control system judges the working condition of the combine harvester based on operating parameters of the combine harvester; when it is determined that the combine harvester is in the non-working state, the controller controls a contraction of the stubble righting device hydraulic cylinder to lift the stubble righting device to an established safe position; when the combine harvester is judged to be in the working state the profiling contact sensor measures the height of the header from the ground and sends the height to the controller; the controller adjusts the stubble height by controlling an expansion or contraction of the header lifting hydraulic cylinder; the controller, after processing with prediction methods, adjusts a height of the stubble righting device by controlling an expansion or contraction of the stubble righting device hydraulic cylinder; and matching the forward speed with the device rotation speed: the forward speed and device rotation speed matching module selects the corresponding speed based on a combine harvester forward speed measured by the speed radar in real time, and sends the corresponding speed to the motor through the controller to control the rotation speed of the stubble righting device; the speed radar collects a speed signal of the combine harvester and inputs the speed signal into the controller; the forward speed and device rotation speed matching module of the self-adaptive control system obtains the optimal matching relationship between the forward speed and the rotation speed of the stubble righting device based on simulation; the forward speed and device rotation speed matching module selects the corresponding speed based on a real-time speed signal of the combine harvester collected by the speed radar, then send the corresponding speed to the motor through the controller to control the rotation speed of a rotating shaft of the stubble righting device.

2. The self-adaptive control system for the stubble height and righting operation of ratooning rice according to claim 1, wherein the plurality of teeth are detachably connected to the tooth installation seats.

3. The self-adaptive control system for the stubble height and righting operation of ratooning rice according to claim 2, wherein in the step of determining the working condition of the stubble righting device, a prediction method comprises:

a relationship between a height change of the header and an expansion and contraction of the header lifting hydraulic cylinder is:

$$\Delta H_i = L_1 \left[ \cos\left(\sum_{i=1}^{n-1}(\Delta\theta_i + \theta_0) + \arccos\frac{m^2 + k^2 - (\Delta K + L_2)^2}{2mk} - \left(\sum_{i=1}^{n-1}(\Delta\theta_i + \theta_0) - \alpha\right)\right) - \cos\left(\sum_{i=1}^{n-1}(\Delta\theta_i + \theta_0)\right) \right],$$

wherein $\Delta H_i$ is the height change of the header, $L_1$ is a distance from a rotation center C to a cutting blade E, i is time, $\theta_i$ is an angle measured by the header angle sensor at the time i, $\Delta\theta_i$ is an angle change measured by the header angle sensor, $\theta_0$ is an initial clamping angle of the header, m is a distance from the rotation center to a support point of the header lifting hydraulic cylinder, k is a distance from the rotation center C to an installation position A of the header lifting hydraulic cylinder, $\Delta K$ is the expansion or contraction amount of the header lifting hydraulic cylinder, $L_2$ is a length of the header lifting hydraulic cylinder, $\alpha$ is an angle of ∠ACD, wherein point A is a fulcrum of the header lifting hydraulic cylinder, point C is a center of rotation of a feeder, D is a point where point C is perpendicular to the ground, and $\alpha$ is a fixed angle;

a relationship between the expansion or contraction of the stubble righting device hydraulic cylinder and a height change of the stubble righting device is as follows:

$$\Delta K' = \sqrt{\left(L\cos\left(\theta_0' + \frac{1}{l}\sum_{i=1}^{n}\Delta H_i\right) - a\right)^2 + \left(L\sin\left(\theta_0' + \frac{1}{l}\sum_{i=1}^{n}\Delta H_i\right) - b\right)^2} -$$

$$\sqrt{\left(L\cos\left(\arcsin\frac{\Delta H_i}{l} + \theta_0' + \frac{1}{l}\sum_{i=1}^{n}\Delta H_i\right) - a\right)^2 + \left(L\sin\left(\arcsin\frac{\Delta H_i}{l} + \theta_0' + \frac{1}{l}\sum_{i=1}^{n}\Delta H_i\right) - b\right)^2};$$

wherein $\theta_r$ is an angle between a support arm and the chassis frame measured at time i, with an initial angle of $\theta_0'$, (a, b) is a coordinate of an installation support point of the stubble righting device hydraulic cylinder $\Delta K'$ is the extension or contraction of the stubble righting device hydraulic cylinder, l is a distance between an arm rotation center B and a stubble righting device shaft center F, and L is the distance between the arm rotation center B and a connection point G between the stubble righting device hydraulic cylinder and the hydraulic cylinder bracket.

4. A harvester, comprising the self-adaptive control system for the stubble height and righting operation of ratooning rice according to claim 1.

5. The harvester according to claim 4, wherein the plurality of teeth are detachably connected to the tooth installation seats.

6. The harvester according to claim 5, wherein in the step of determining the working condition of the stubble righting device, a prediction method comprises:

a relationship between a height change of the header and an expansion and contraction of the header lifting hydraulic cylinder is:

$$\Delta H_i = L_1\left[\cos\left(\sum_{i=1}^{n-1}(\Delta\theta_i + \theta_0) + \arccos\frac{m^2 + k^2 - (\Delta K + L_2)^2}{2mk} - \right.\right.$$

$$\left.\left.\left(\sum_{i=1}^{n-1}(\Delta\theta_i + \theta_0) - \alpha\right)\right) - \cos\left(\sum_{i=1}^{n-1}(\Delta\theta_i + \theta_0)\right)\right],$$

wherein $\Delta H_i$ is the height change of the header, $L_1$ is a distance from a rotation center C to a cutting blade E, i is time, $\theta_i$ is an angle measured by the header angle sensor at the time i, $\Delta\theta_i$ is an angle change measured by the header angle sensor, $\theta_0$ is an initial clamping angle of the header, m is a distance from the rotation center to a support point of the header lifting hydraulic cylinder, k is a distance from the rotation center C to an installation position A of the header lifting hydraulic cylinder, $\Delta K$ is the expansion or contraction amount of the header lifting hydraulic cylinder, $L_2$ is a length of the header lifting hydraulic cylinder, $\alpha$ is an angle of $\angle ACD$ wherein point A is a fulcrum of the header lifting hydraulic cylinder, point C is a center of rotation of a feeder, D is a point where point C is perpendicular to the ground, and $\alpha$ is a fixed angle;

a relationship between the expansion or contraction of the stubble righting device hydraulic cylinder and a height change of the stubble righting device is as follows:

$$\Delta K' = \sqrt{\left(L\cos\left(\theta_0' + \frac{1}{l}\sum_{i=1}^{n}\Delta H_i\right) - a\right)^2 + \left(L\sin\left(\theta_0' + \frac{1}{l}\sum_{i=1}^{n}\Delta H_i\right) - b\right)^2} -$$

$$\sqrt{\left(L\cos\left(\arcsin\frac{\Delta H_i}{l} + \theta_0' + \frac{1}{l}\sum_{i=1}^{n}\Delta H_i\right) - a\right)^2 + \left(L\sin\left(\arcsin\frac{\Delta H_i}{l} + \theta_0' + \frac{1}{l}\sum_{i=1}^{n}\Delta H_i\right) - b\right)^2};$$

wherein $\theta_r$ is an angle between a support arm and the chassis frame measured at time i, with an initial angle of $\theta_0'$, (a, b) is a coordinate of an installation support point of the stubble riding device hydraulic cylinder, $\Delta K'$ is the extension or contraction of the stubble righting device hydraulic cylinder, l is a distance between an arm rotation center B and a stubble righting device shaft center F, and L is the distance between the arm rotation center B and a connection point G between the stubble righting device hydraulic cylinder and the hydraulic cylinder bracket.

* * * * *